United States Patent [19]
Borovsky et al.

[11] 3,775,611
[45] Nov. 27, 1973

[54] APPARATUS FOR SPECTRAL ANALYSIS OF SPECIMENS CONTAINING LIGHT-WEIGHT ELEMENTS

[76] Inventors: Igor Borisovich Borovsky, prospekt Mira, 70a, kv. 11; Alexandr Ivanovich Kozlenkov, ulitsa Fomichevoi, 9, kv. 51; Vladimir Grigorievich Bogdanov, ulitsa Fersmana, 5, kv. 80, all of Moscow, U.S.S.R.

[22] Filed: July 24, 1972

[21] Appl. No.: 274,292

Related U.S. Application Data
[63] Continuation-in-part of Ser. No. 40,934, May 27, 1970, abandoned.

Foreign Application Priority Data
[30] June 6, 1969 U.S.S.R. ..................1328355

[52] U.S. Cl. ............................. 250/310, 250/51.5
[51] Int. Cl. ................................. G01n 23/22
[58] Field of Search .............. 250/51.5, 49.5 PE

[56] References Cited
UNITED STATES PATENTS
2,653,249  9/1953  Harker ........................... 250/51.5
2,945,953  7/1960  Martin ........................... 250/51.5
3,160,749  12/1964  Spielberg ..................... 250/51.5
3,471,694  10/1969  Poen ............................ 250/51.5

*Primary Examiner*—James W. Lawrence
*Assistant Examiner*—C. E. Church
*Attorney*—John C. Holman et al.

[57] ABSTRACT

An apparatus for the X-ray spectral analysis of specimens containing light-weight elements comprises two mirrors of the same curvature and with the same reflecting coating. One of the mirrors is the entrance mirror and is placed in the path of the primary beam of X-rays excited in the specimen, while the other mirror is placed in the path of the radiation reflected from the entrance mirror. The two mirrors make equal angles with the radiation incident upon them.

3 Claims, 3 Drawing Figures

APPARATUS FOR SPECTRAL ANALYSIS OF SPECIMENS CONTAINING LIGHT-WEIGHT ELEMENTS

This is a Continuation-in-Part of Application Ser. No.40,934 now abandoned.

The present invention relates to improvements in an apparatus for X-ray spectral analysis of specimens containing light-weight elements and may be used, for example, in the X-ray microprobe analyzer to determine the content of light-weight elements in alloys, minerals, and compounds.

It is well known that X-rays falling upon medium do reflect from its surface with high efficiency in the grazing incidence region. The total external reflection takes place at the angles smaller than a certain critical angle $$\phi_0 = \sqrt{2\gamma}$$

where $\gamma$ is the refraction index unit decrement. The angle $\phi_0$ is often described as a critical angle for total reflection because it defines approximately the angular region $\Delta\phi$ for which the reflected intensity "cuts-off." The value of $\phi_0$ and the angular region $\Delta\phi$ for which the reflectance curve falls off the zero with increasing angle depends on the wavelength of X-ray radiation incident upon the reflector as well as on the material of its surface. For a non-absorbing medium the angle $\phi_0$ is strictly defined by the specified wavelength, that is, the reflection curve falls abruptly to zero at $\phi = \phi_0$. For all real substances, however, which partly absorb an incident radiation the reflection curve decreases gradually within the angular region $\Delta\phi$. by varying the reflector material or by putting the various coatings on its surface one may change both $\phi_0$ and the angular region $\Delta\phi$. The reflection characteristics for the ultra-soft X-ray region of 10— to 115 A have been investigated for a number of coatings. Some of substances, for example, metallic aluminium, titanium, vanadium, cromium, nickel and gold are evaporated on the polished glass surfaces from heated spirals of from crucibles, calcinated by electron bombardment. The thickness of evaporated layers is usually of the order of 1000 A and can be evaluated, for example, by method of multibeam interferometry. The reflecting coating may also be a polystyrene, thin layers of which are put on a glass surface by sinking the latter into 1,5 percent solution of polystyrene in toluene. From the measurements of the X-ray reflection coefficient for the various wavelengths at a fixed angle of incidence the spectral behaviour of the X-ray reflection can be easily determined. For all known coatings the X-ray reflection spectrum has more or less pronounced shortwave limit, that is, the wavelength region for which the reflection falls off to zero. This region depends on the angle of incidence as well as on the reflector substance or the material of the reflector coating.

A precise knowledge of the total reflection curve is important in the design of mirror-monochromators, of optimized diffraction gratings and of astronomical telescope systems for the X-ray region.

The mirrors with specified reflecting coatings can also be used as filters of the shortwave radiation in the X-ray ultra-soft spectrometers and in the apparatus for X-ray analysis of light-weight elements.

It is known in the art an apparatus for non-dispersive analysis of light-weight elements which comprises a set of concave mirrors of a different curvature and different coating, each of them may be positioned in the path of X-rays emitted by the specimen, at an angle of incidence smaller that the critical angle of total reflection of the X-ray characteristic $K_\alpha$ line of the element to be analyzed. Each of these mirrors, being placed in the path of the primary beam of X-rays emitted by the specimen, reflects into the detector the $K_\alpha$ radiation of the light-weight element being analyzed by means of this mirror and also the $K_\alpha$ lines of the elements with lower atomic numbers if these elements happen to be present in the sample but reflects very little, if any of the $K_\alpha$ lines and the background radiation due to the heavier elements. By placing various mirrors in the path of X-rays and by recording the radiation they reflect, it is possible to determine the content of light-weight elements in the specimen.

A disadvantage of this apparatus is that the mirror reflects into the detector not only the $K_\alpha$ line of the sought light-weight element but also partly the $K_\alpha$ line of an element whose atomic number is greater by unity, if such element happens to be present in the specimen, and also the lines of other X-ray series and the continuous background radiation due to heavier elements with a wavelength shorter than the wavelength of $K_\alpha$ radiation of the sought element but longer than the critical wavelength corresponding to the threshold of reflection of a given mirror. This is explained by the fact that for all known coatings and permissible grazing angles the reflection coefficient near the shortwave limit of reflection varies from a maximum to a minimum gradually and the spectral range within which this change takes place exceeds the distance on the wavelength scale between the $K_\alpha$ lines of elements with adjacent atomic numbers.

An object of the present invention is to raise the signal - to - background ratio, that is, the ratio of the intensity of the $K_\alpha$ line of the sought light-weight element to that of an element with an atomic number greater by unity or to that of the interfering lines and background radiation due to heavier elements.

A particular object of the invention is to arrange an apparatus so that the radiation at its output experiences a maximum change in intensity within a minimum wavelength region near the X-ray $K_\alpha$ line of the sought element.

This object is accomplished by the fact that in an apparatus for X-ray spectral analysis of specimens containing light-weight elements, according to the invention, there is an additional concave mirror placed in the path of the X-ray beam reflected by the first mirror at an angle equal to the angle of incidence of the specimen's radiation upon the first mirror, the additional mirror having a coating identical with that of the latter.

The invention will be best understood from the following description of a preferred embodiment when read in connection with the accompanying drawings, wherein.

Figure 1:
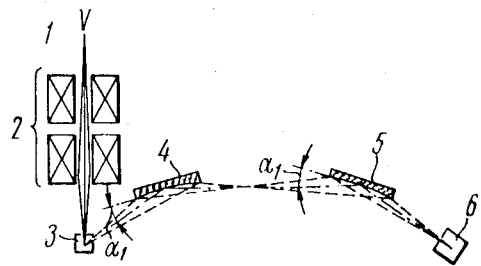
FIG. 1 is a block-diagram of an apparatus according to the invention.

Referring to the drawings, according to the invention, the apparatus comprises: an electron emitting source or electron gun 1; the electron-optical system 2 to form a narrow electron beam with the energy sufficient for the excitation of the X-ray spectra of light-weight elements and to focus said electron beam upon a specifiable limited area of the specimen being analyzed; the specimen holder in which the specimen 3 under investigation is positioned in the path of the electron beam, this specimen being a section of an alloy, mineral or compound containing the light-weigth elements; two concave mirrors 4 and 5 placed in the path of the X-ray emitted by the specimen 3; the detector means which may be, for example, a proportional gas-filled counter or electronic multiplier sensitive to the X-ray ultra-soft wavelength region. The concave mirrors 4 and 5 have the same curvature and an identical reflecting coating. The material of coating may be one of the substances, mentioned above, or other which reflection efficiency for the ultra-soft-X-ray region is known or can be measured in the preliminary experiments. The angle of incidence of X-rays upon the mirror and the material of its coating are chosen so as to reflect into detector the K -radiation of the element being analyzed and attenuate as strong as possible the intensity of K lines and shortwave background of the elements with higher atomic numbers. The beam of X-rays excited in the specimen under electron bombardment passes through an opening in the wall (omitted in FIG. 1 and FIG. 3) separating the specimen chamber and the volume where the mirrors and the detector placed and falls upon the first concave mirror 4. This mirror makes with the primary beam of X-rays emitted by the specimen and angle $\alpha_1$, which is smaller than the angle of total external reflection of the K line wavelength of the element being analyzed and provides for the reflection of X-rays in the specified wavelength region. The radiation reflected from the mirror 4 strikes the additional concave mirror 5 at an angle equal to the angle of incidence of the primary radiation on the first mirror 4.

In the prior art apparatus with a single mirror, the ratio of the intensities of the K lines recorded by the detector for two adjacent light-weight elements with atomic numbers Z and Z+1 is proportional to the ratio of the respective reflection coefficients, $R_z/R_{z+1}$ for the wavelengths of the K lines of these elements. When use is made of two consecutively reflecting mirrors 4 and 5 having the same coating and the same radius of curvature and positioned at one and the same angle to the incident X-ray beam, this ratio is proportional to $(R_z/R_{z+1})^2$. For all known coatings and angles of incidence the ratio $R_z/R_{z++1}$ is anywhere between 10 and 20. When use is made of two identical mirrors arranged in tandem, this ratio becomes from 100 to 400, while with r mirrors used, it will be from $10^n$ to $20^n$. This implies that in an analysis of an element Z by means of two or more series-arranged mirrors it is possible to cut off practically all interfering radiation of the element with atomic number Z+1 and the shortwave background radiation. The accompanying attenuation of the K line of the sought element is insignificant, since the reflection coefficient for the wavelength of this line, $R_z$, is very nearly unity.

Figure 2:
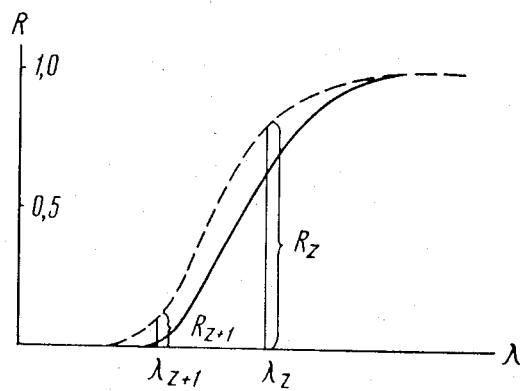
FIG. 2 are plots relating the X-ray intensity at the output of the apparatus to the wavelength of the radiation.

This advantage of the apparatus disclosed herein readily transpires from a comparison of the spectral curves relating the recorded intensity of X-rays at the output of the apparatus to the wavelength used. The solid line in FIG. 2 corresponds to the intensity obtained with two consecutively reflecting mirrors 4 and 5, while the broken line represents the X-ray intensity with only one concave mirror 4 used.

It should be borne in mind that total angle of deflection measured from the direction of the primary beam incident upon the first mirror 4 at the angle $\alpha$ amounts to 4 $\alpha$ after being reflected from the additional mirror, while after reflection from n additional mirrors the angle becomes equal to $2n\alpha$. Since the angles $\alpha$ are small ranging from 2° to 10°, while the radii of curvature of the mirrors are large, the increase in the angle of deflection from the original direction is of considerable importance, since it makes it possible to eliminate the background radiation scattered by the mirror holder and other objects, and also the background radiation due to the quanta of the primary beam finding their way from the specimen into the detector.

Figure 3:
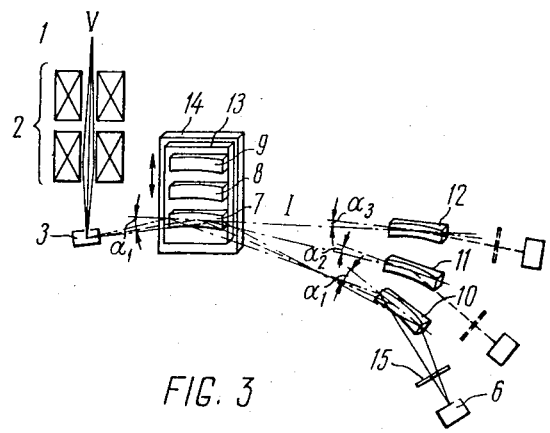
FIG. 3 is a second embodiment of the apparatus according to the invention.

In order to eliminate the longwave background radiation and attenuate the K lines of light-weight elements with atomic numbers lower than that of the element to be analyzed, and also to attenuate the interfering lines with a wavelength longer than that of the K 24 line of the sought element, use may be made of an absorbing filter 15 in FIG.3 (not shown in FIG. 1), with films of varying thickness, fabricated from nitrocellulose or other material, which is placed in the path of the X-ray beam between the additional mirror and the detector.

FIG. 3 shows one of the possible embodiments of an apparatus for X-ray analysis of specimens containing several light weight elements.

This apparatus has several first concave mirrors 7, 8 and 9 and the equal number of additional mirrors 10, 11, and 12. The first mirrors 7, 8, 9 are mounted one above the other in a mount 13 set up on a carriage 14 free to move in a vertical direction, while the additional mirrors are stationary. The mirrors 7 and 10, 8 and 11, 9 and 12 make up, respectively, an operating set, that is, the mirrors in each set have the same reflecting coating and the same curvature.

The first mirrors 7, 8 and 9 differ between each other in the material of the coating and make with the primary X-ray beam different angles, $\alpha_1$, $\alpha_2$ and $\alpha_3$, respectively. Thus, each mirror reflects X-rays within a specified wavelength region. The additional mirror, say 10, in each set, say 7 and 10, makes with the reflected X-ray beam travelling from the respective first concave mirror, 7, the same angle which the concave mirror 7 makes with the primary beam of X-ray emitted by the specimen.

By moving and locating the carriage 14 in a desired position, the selected mirror, say 7, is arranged in the primary X-ray beam, thereby providing the choice of a specified range of X-ray wavelengths. Since the first concave mirrors differ in angle of incidence, the radiation reflected from the selected first mirror 7 can only reach the corresponding stationary additional mirror 10 and then the detector.

In changing over to analysis of some other element, another mirror, say 8, is brought in line with the primary X-ray beam, so that X-ray reflected by this mirror strike the additional mirror 11 and then reach the detector.

An additional advantage of the apparatus disclosed herein consists in that the angleof incidence of X-rays on each of the first concave mirrors is maintained exactly constant.

What is claimed is:

1. An apparatus for X-ray spectral analysis of a specimen containing light weight elements, comprising: an electron emitting source, means to form a narrow electron beam with the energy sufficient for the excitation of intense X-ray spectra of light-weight elements in the specimen and to focus said beam upon a selected area of the specimen being analyzed; a first concave mirror having an X-ray reflecting coating and placed in a path of a primary beam of X-rays so that the primary beam is incident on the concave mirror at a known grazing angle which angle is predetermined by said reflecting coating and curvature of said first concave mirror; at least an additional concave mirror which is the second mirror and is identical to the first concave mirror and so disposed that the X-ray beam reflected by the first mirror is incident directly upon the second mirror at the same angle as said known angle, whereby the characteristic and continuous X-ray radiation of the wavelengths shorter than that of the characteristic line of a given element is strongly attenuated; and a detector means for recording an output from the second mirror, said first and second mirrors constituting a first set of identical mirrors.

2. An apparatus as claimed in claim 1 comprising a plurality of sets of concave mirrors substantially similar to the mirrors in said first set of mirrors, mirrors in each of sets being identical, and mirrors in different sets having different curvatures and reflecting coatings for analysing different light-weight elements, the apparatus also including a movable carriage on which the first concave mirrors of each sets are mounted so that any desired set of said plurality of mirrors can be brought in line with said primary beam by moving said carriage, so as to identify different light weight elements in the specimen.

3. An apparatus as claimed in claim 1 for filtering continuous and characteristic X-ray radiation having a wavelength shorter than that of the characteristic line of a given element, comprising two or more stationary concave mirrors having identical curvature and reflecting coating and mounted so that the X-ray beam emitted by the specimen is successively reflected from the surface of each of said mirrors at a constant angle which is smaller than a critical angle of total external reflection of the wavelength of the characteristic line of the given element.

* * * * *